(12) United States Patent
Lee

(10) Patent No.: US 11,847,093 B2
(45) Date of Patent: Dec. 19, 2023

(54) SYSTEM AND METHOD FOR MANAGING A PLURALITY OF DATA STORAGE DEVICES

(71) Applicant: Thomas C Lee, Brentwood, NY (US)

(72) Inventor: Thomas C Lee, Brentwood, NY (US)

( * ) Notice: Subject to any disclaimer, the term of this patent is extended or adjusted under 35 U.S.C. 154(b) by 0 days.

(21) Appl. No.: 17/729,373

(22) Filed: Apr. 26, 2022

(65) Prior Publication Data

US 2022/0342849 A1  Oct. 27, 2022

Related U.S. Application Data

(60) Provisional application No. 63/179,722, filed on Apr. 26, 2021.

(51) Int. Cl.
*G06F 16/00* (2019.01)
*G06F 16/13* (2019.01)
*G06F 16/14* (2019.01)

(52) U.S. Cl.
CPC ............ *G06F 16/13* (2019.01); *G06F 16/156* (2019.01)

(58) Field of Classification Search
None
See application file for complete search history.

(56) References Cited

U.S. PATENT DOCUMENTS

| | | | | |
|---|---|---|---|---|
| 7,720,889 B1 * | 5/2010 | Goodson | ................. | G06F 16/13 707/655 |
| 10,162,793 B1 * | 12/2018 | Bshara | ................... | H04L 69/16 |
| 2002/0111956 A1 * | 8/2002 | Yeo | ....................... | G06F 16/134 |
| 2004/0122911 A1 * | 6/2004 | Chong, Jr. | .......... | G06F 13/4022 709/217 |
| 2009/0072965 A1 * | 3/2009 | Staab | .................... | G06Q 10/06 340/539.11 |
| 2009/0172049 A1 * | 7/2009 | Hahn | ................... | G06F 3/0643 |
| 2010/0332703 A1 * | 12/2010 | Ejiri | ..................... | G06F 16/122 710/104 |
| 2011/0012727 A1 * | 1/2011 | Pance | ................ | G06F 13/4068 340/505 |
| 2014/0061297 A1 * | 3/2014 | Smith | ................ | G06F 16/9554 235/494 |
| 2014/0206336 A1 * | 7/2014 | Li | ....................... | H04W 64/003 455/419 |
| 2019/0334774 A1 * | 10/2019 | Bennett | ................. | H04L 49/357 |
| 2019/0356551 A1 * | 11/2019 | Lekshmanan | ........ | H04L 43/045 |
| 2020/0117690 A1 * | 4/2020 | Tran | .................. | G06F 16/90332 |
| 2020/0387493 A1 * | 12/2020 | Cr | ...................... | G06F 16/2272 |
| 2021/0019271 A1 * | 1/2021 | Eun | ....................... | G06F 13/385 |
| 2021/0104118 A1 * | 4/2021 | Schwartz | ............... | G06Q 20/18 |
| 2022/0342849 A1 * | 10/2022 | Lee | ....................... | G06F 16/156 |

* cited by examiner

*Primary Examiner* — Hasanul Mobin
(74) *Attorney, Agent, or Firm* — Barry Choobin; Patent 360

(57) ABSTRACT

A system and method for managing files on multiple storage devices, such as USB sticks. The system includes a hub that has multiple input ports for multiple storage devices, wherein has a unique code visually presented next to the respective port. The system can assign a barcode label to each storage device which can be printed and pasted on the respective memory device. The system further scans the files on each of the multiple storage devices to generate a master index based on the unique identification code for each storage device.

16 Claims, 5 Drawing Sheets

SYSTEM AND METHOD FOR MANAGING A PLURALITY OF DATA STORAGE DEVICES

CROSS-REFERENCE TO RELATED APPLICATIONS

This application claims priority from the U.S. provisional patent application Ser. No. 63/179,722, filed on Apr. 26, 2021, which is incorporated herein by reference in its entirety.

FIELD OF INVENTION

The present invention relates to a system and method for managing several memory devices, and more particularly, the present invention relates to a system and method for the identification and indexing of several memory devices.

BACKGROUND

Data storage has become critical, and a range of data storage devices are available to cater to different storage needs. The data storage devices can be broadly classified into fixed storage devices and portable storage devices. The fixed data storage device can be fixed to a computing system, such as the hard disk of a laptop, memory of a smartphone, and cloud storage. The portable data storage devices can be carried and include portable hard disks, CD, DVD, Blue ray disks, and USB sticks. USB sticks are available in small capacities and a number of USB sticks can be used by a user. In addition, external storage can include such as SAN, NAS, virtual and cloud storage services, of any size. Moreover, in an organization, different members of the organization can have a USB stick. The portability of a USB stick can be an advantage, however, using multiple USB sticks and portable storage devices can have a drawback. A user can copy a file to one of several USB sticks, and later forgets to which USB stick, the file was copied. Checking all the drives can be both time-consuming and tedious.

A need is therefore appreciated for a system and method to manage multiple storage devices.

The phrases "data storage device", "storage device", and "memory device" are interchangeably used hereinafter and refer to any electronic device for use in the storage of data.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method for managing multiple data storage devices.

It is another object of the present invention that the system and method allow a user to locate a file on any of the registered memory devices through a single interface.

It is another object of the present invention to save time in searching for a file in multiple storage devices.

It is still another object of the present invention that the system and method are compatible with distinct types of storage devices.

In one aspect, disclosed is a system and method for managing multiple storage devices.

In one aspect, disclosed is a system for managing files on multiple storage devices, the system comprises a hub, the hub has a plurality of input ports configured to connect a plurality of storage devices, each input port of the plurality of input ports has a unique code visually presented next to the respective input port; the system further comprises a processor and a memory, the system configured to implement a method comprising the steps of: connecting, through a device module implemented within the system and upon execution by the processor, to the plurality of storage devices, wherein the plurality of storage devices are connected to the plurality of input ports, wherein the device module comprises a mapping of the plurality of input ports to their respective unique codes; assigning, by the device module, a unique identification code to each storage device of the plurality of storage devices; presenting a screen, through an interface module implemented within the system and upon execution by the processor, wherein the screen comprises a plurality of barcode labels for each of the plurality of storage devices, wherein each barcode label of the plurality of barcode labels comprises a graphical representation of the respective unique identification code and the respective unique code; and indexing, by an indexing module implemented within the system and upon execution by the processor, files on the plurality of storage devices to generate a master index. The plurality of input ports comprises USB Type-A ports and USB Type-C ports.

In certain implementations, the system is further configured to implement the steps of presenting the master index, through an interface provided by the interface module; receiving a keyword, through the interface for querying the master index; and presenting results of querying the master index. The system is further configured to implement the steps comprising steps of scanning a barcode label of a storage device of the plurality of storage devices; reading the unique identification code from the barcode label; and presenting an index associated with the unique identification code.

In one aspect, disclosed is a method for organizing files on multiple storage devices, the method implemented within a system comprising a processor and a memory, the system further comprises a hub, the hub has a plurality of input ports configured to connect a plurality of storage devices, each input port of the plurality of input ports has a unique code visually presented next to the respective input port, wherein the method further comprises the steps of connecting, through a device module implemented within the system and upon execution by the processor, to the plurality of storage devices, wherein the plurality of storage devices are connected to the plurality of input ports, wherein the device module comprises a mapping of the plurality of input ports to their respective unique codes; assigning, by the device module, a unique identification code to each storage device of the plurality of storage devices; presenting a screen, through an interface module implemented within the system and upon execution by the processor, wherein the screen comprises a plurality of barcode labels for each of the plurality of storage devices, wherein each barcode label of the plurality of barcode labels comprises a graphical representation of the respective unique identification code and the respective unique code; and indexing, by an indexing module implemented within the system and upon execution by the processor, files on the plurality of storage devices to generate a master index. The plurality of input ports comprises USB Type-A ports and USB Type-C ports. The method further comprises the steps of presenting the master index, through an interface provided by the interface module; receiving a keyword, through the interface for querying the master index; and presenting results of querying the master index. The method further comprises the steps of scanning a barcode label of a storage device of the plurality of storage devices; reading the unique identification code from the barcode label; and presenting an index associated with the unique identification code.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe embodiments only and is not intended to be limiting to embodiments of the invention. As used herein, the singular forms "a", "an", and "the" are intended to include the plural forms as well, unless the context indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 1:
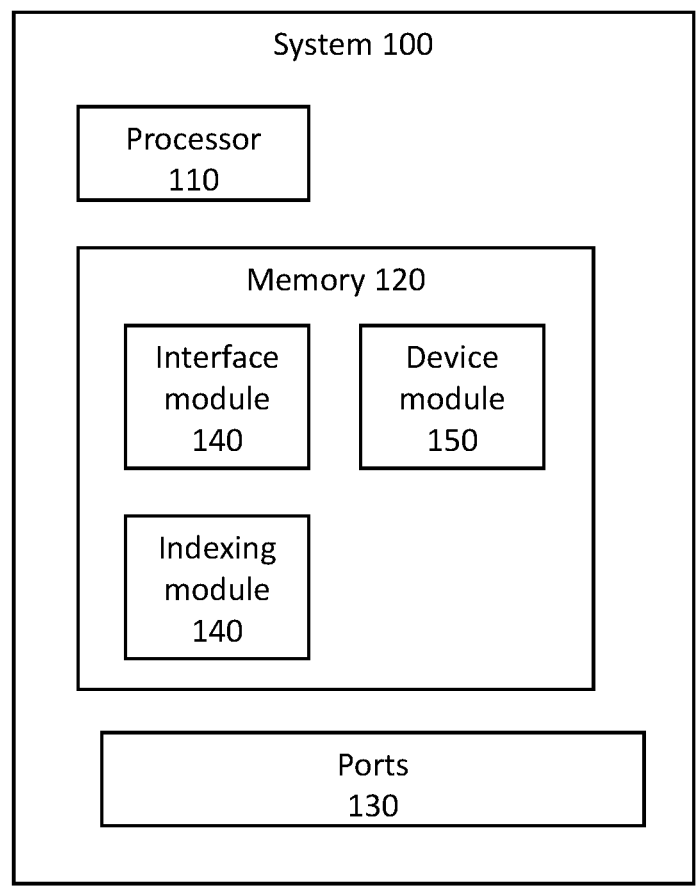
FIG. 1 is a block diagram showing the architecture of the disclosed system, according to an exemplary embodiment of the present invention.

Disclosed is a system and method for managing multiple storage devices, such as USB sticks. The disclosed system can include indexing functionality that can index the files on different storage devices, and the index can be presented on a screen of an interface. Referring to FIG. 1 which is a block diagram showing an architecture of the disclosed system 100. The system can include a processor 110 and a memory 120. The system 100 can also include suitable ports 130 for connecting to a hub 200, a barcode scanner, and a printer. It is understood that the ports can be wired ports, wireless ports, or both the wired ports and wireless ports can be embodied.

The memory 120 can include an interface module 140, a device module 150, and an indexing module 160. The interface module 140 upon execution by the processor 110 can provide an interface for interacting with a user. The device module 150 upon execution by the processor can connect with the hub 200 and to different data storage devices, and to a barcode scanner, and a printer. The indexing module 160 upon execution by the processor can crawl different storage devices and create a common index for the files in the multiple devices.

Figure 2:
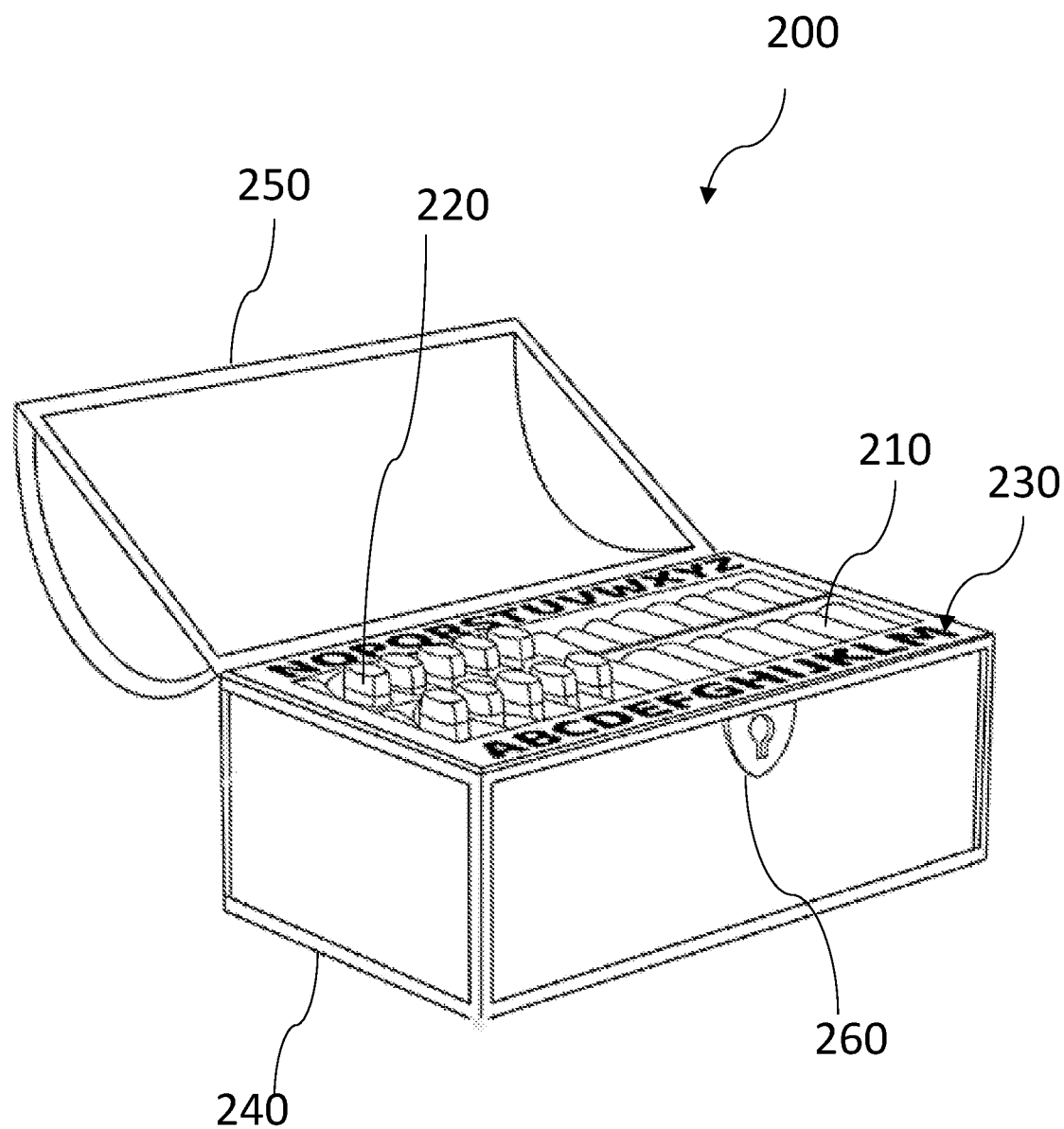
FIG. 2 shows a hub of the disclosed system, according to an exemplary embodiment of the present invention.
Figure 3:
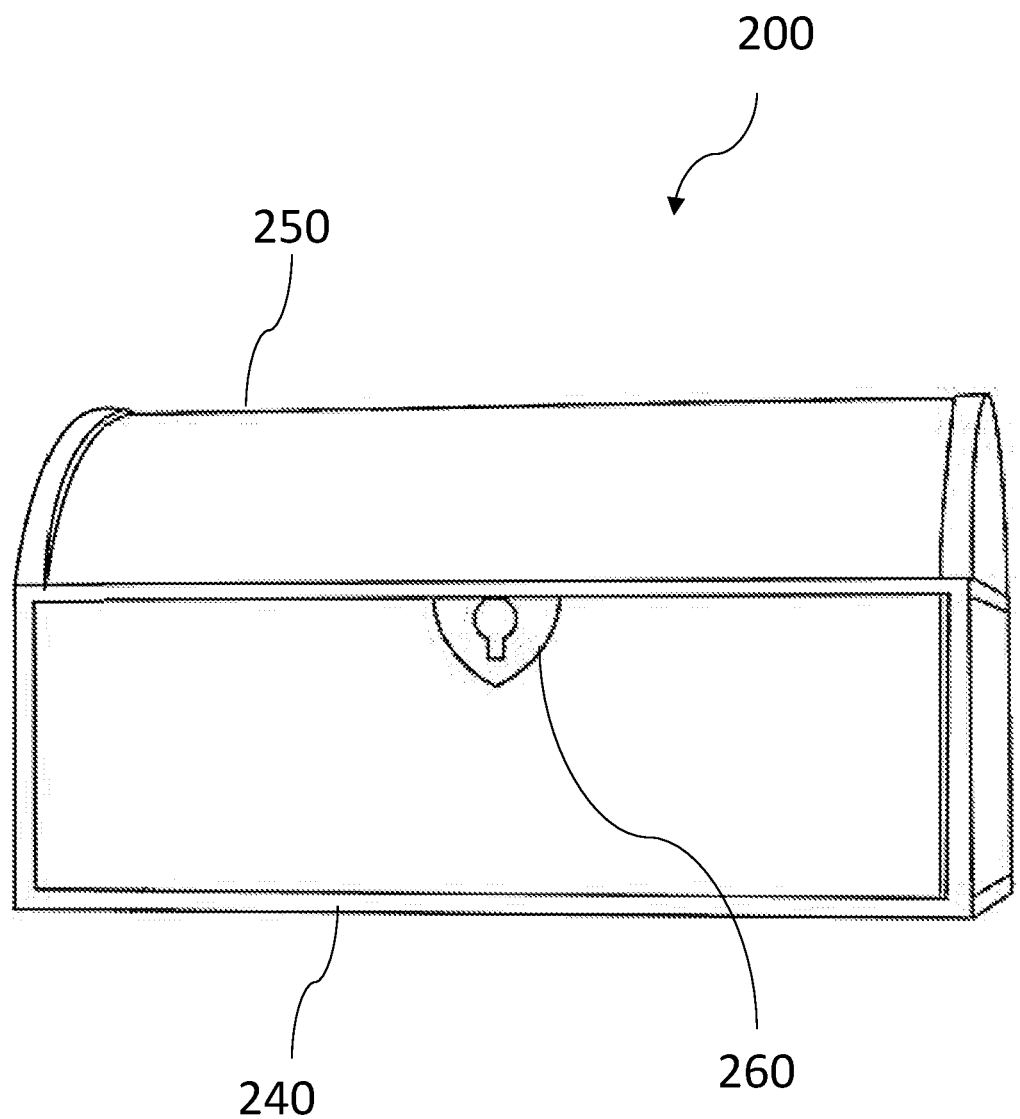
FIG. 3 shows another view of the hub, according to an exemplary embodiment of the present invention.
Figure 4:
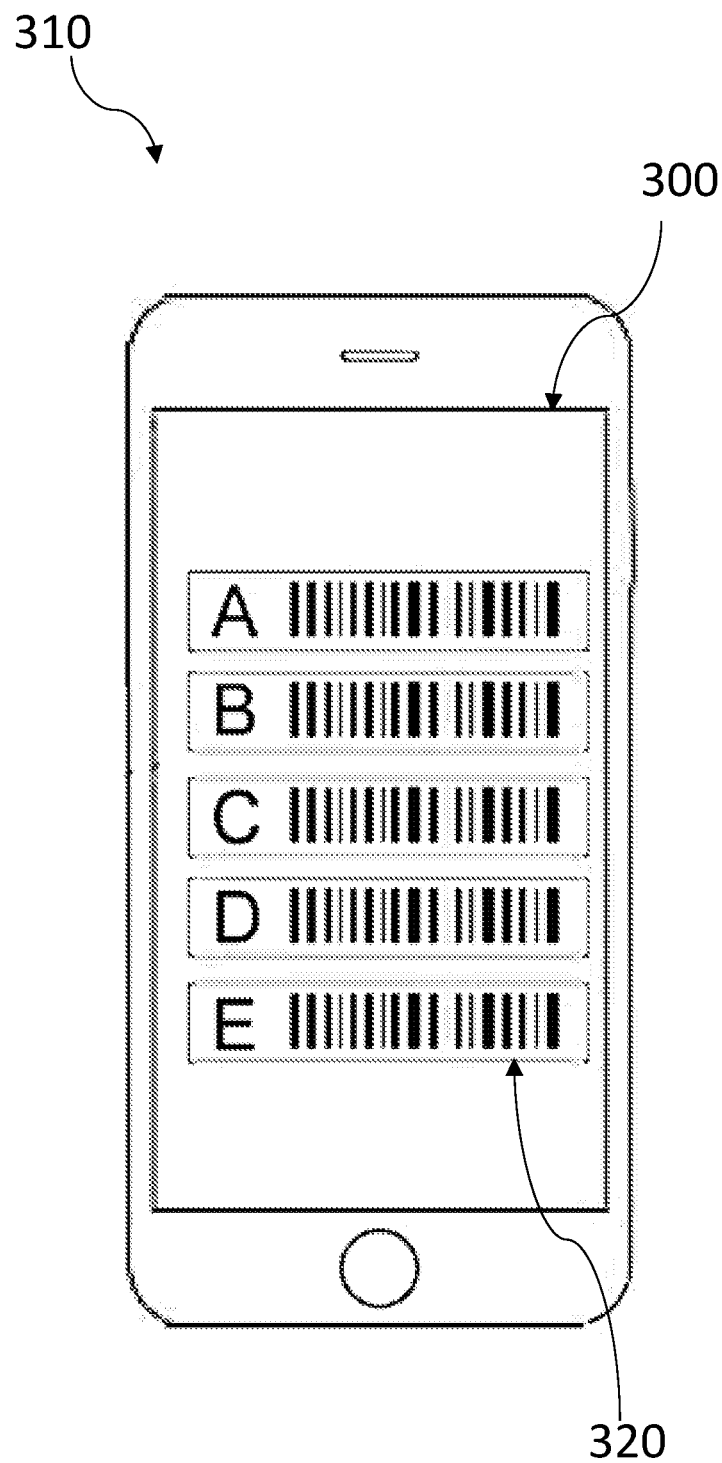
FIG. 4 shows a screen of an interface for printing the barcode labels, according to an exemplary embodiment of the present invention.

Referring to FIG. 2 which shows a hub 200 that can be connected to the disclosed system 100. The hub 200 can include multiple input ports 210 for connecting to multiple storage devices. FIG. 2 shows the two rows of the input ports 210, in which few of the ports are shown occupied by the USB sticks 220. All the input ports 210 can be of the same type or some of the ports can be different. For example, all the ports can be the same USB ports. Alternatively, different ports can be provided for different types of storage devices, such as USB Type A, USB 3.0, USB Type C, USB micro, and the like can be provided to allow connecting different storage devices. Also shown in FIG. 2 are the port identifiers 230 which are unique codes visually presented next to each input port, the unique code can be a letter and/or number or a combination of the letters and numbers. FIG. 2 shows a unique alphabet as the unique code printed next to each input port. Each input port can be provided a unique identifier that can be placed next to the respective input port such that it be visible to the user. The hub 200 can further include a casing 240 for housing the input ports 210 and electrical circuitry for the hub 200. A lid 250 can also be provided for closing the open top of casing 240. The lid 250 can be provided with a lock 260 that can secure the opening of the lid, thus providing a certain degree of protection again theft or intentional damage to the storage devices connected to the input ports 210. The hub can also include an output port (not shown) that can connect the hub 200 and the input ports 210 to the disclosed system 100. FIG. 3 shows the hub 200 in a closed state which appears like a chest box, perhaps, an aesthetic appearance can be provided to the hub 200.

Figure 5:
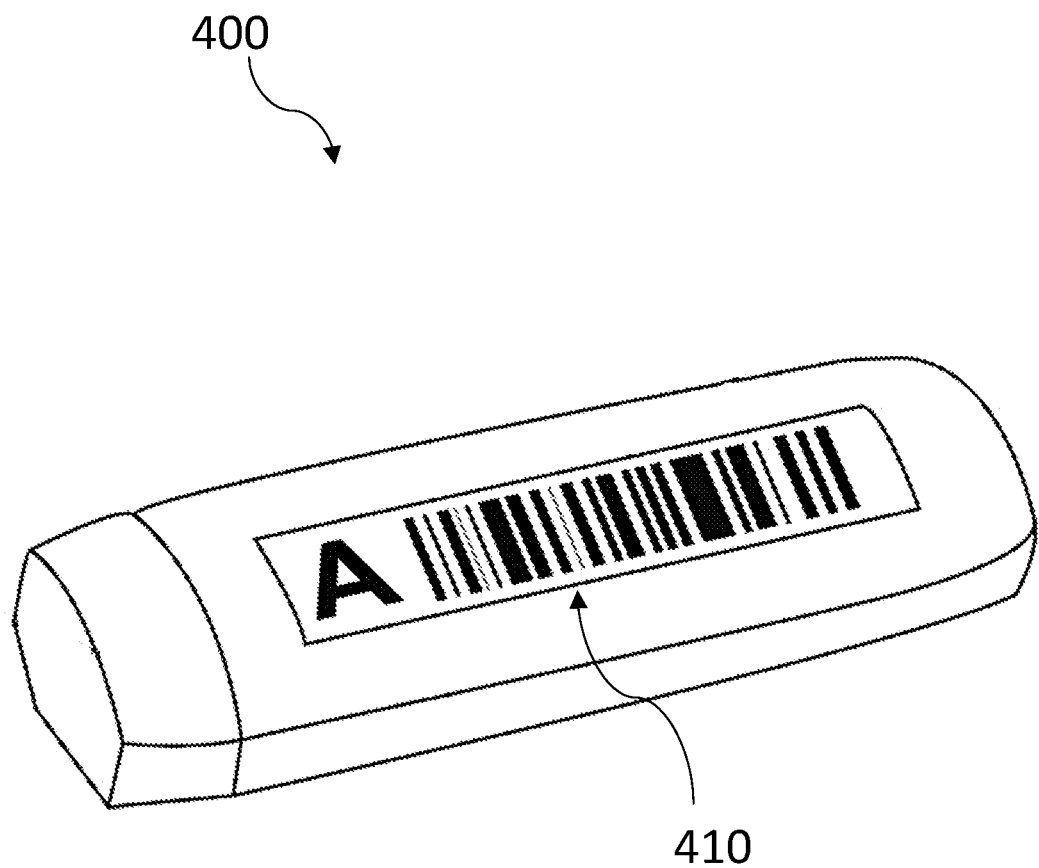
FIG. 5 shows a USB drive with the barcode label, according to an exemplary embodiment of the present invention.

The disclosed device module 150 can provide for connection to the disclosed hub 200. The device module 150 can recognize and connect to the different storage devices 220 connected to the disclosed hub 200. The device module 150 can be pre-configured with the details of the input ports 210 i.e., the port identifier. The device module 150 can recognize the connected storage devices 220 and the respective ports to which the storage devices 220 are connected. The device module 150 can present a screen 300 on a user device 310 through the interface module 140. The screen 300 can include barcode labels 320, wherein each of the bar code labels 320 can include a port identifier/unique code and unique identification code for the respective memory device. The unique identification code can be graphically represented in the form of a barcode or any other graphical representation that can be scanned to read the information encoded in the graphical representation. The device module 150 can receive the scanned image of the bar code and read the unique identification code from the scanned image for the unique identification code. The screen 300 allows the barcode labels 320 to be printed. The disclosed system can be connected to a printer for printing the barcode labels. It is understood that the term barcode herein includes other types of graphical representations of information, such as "QR code". The barcode label can then be pasted to a respective memory device, as shown in FIG. 5. FIG. 5 shows a USB stick 400 to which the barcode label 410 is pasted. The barcode label can be scanned to read to the unique identification code associated with the memory device, thus recognizing the memory device. The port identifiers on the barcode labels can help to recognize the associated memory device connected to the hub 200. For example, the user can check from the printed barcode label the port identifier, for example, the first barcode label on screen 300 has "A" port identifier. Then the user can withdraw the memory device from the input port A of the hub and can then paste the barcode label to the memory device.

The indexing module 160 can index the files on the memory devices in hub 200. The indexing module 160 can retrieve additional details of the files, such as the date of creation, last date of modification, file size, geotag, and the like. Such information can be used to provide filters on the index. The index can be organized based on memory devices. The indexing module 160 can be compatible with different file systems, such as FAT, NTFS, and the like. Linux can support over a hundred different file systems, and thus the disclosed system can provide a common platform for organizing the files on different memory devices. The user can navigate through the index drive-by-drive. Filters can also be applied to quickly look for target files. For example, the user can look for all JPG images in the index by applying the filter of the JPG extension. The user can apply the filter for size range and can view only those files which have sizes within the specified range. Besides, filtering, the interface may also allow the user to search through the index using keywords, pattern matches, word fragments, and wildcards. The user can search the index using the name of the file and can determine which memory device includes the file.

To see the contents of a memory device, the user may not need to load the memory device but can scan the barcode on the memory device, and an index of the files in the memory device can be presented on a screen. A copy of the index of the files in a memory device can be stored in the respective memory device. An autorun program can also be installed on the memory devices, such as whenever, the memory device is connected to a computer, the autorun program can present the index of the memory device. The autorun can keep a track of any modifications in the files of the memory device. Whenever a memory stick again plugs into the disclosed system, the master index can be updated with the modifications in the memory device. In one implementation, the main or master index can be hosted in cloud server environments and can be accessed from different devices. In certain implementations, the autorun program on the memory devices can sync the local index on the memory device with the master index, such that any changes in the memory device can be synchronized with the master index in near real-time.

In certain implementations, application software can be provided, wherein the application software can be stored in the memory device itself. So, when the memory device is connected, the application can be downloaded to the computer. The user can be presented with a screen that enquired whether the connected memory device is a USB flash drive or an external hard drive. The screen can receive a selection from the user. The application can then ask for a number or letter to headline the barcode label on the device. The BARCODE sticker can be printed as a sticker which can then be pasted to the memory device. The application can then index the files on the memory device. The information can be stored and whenever a new memory device is plugged in, the process can be repeated, and a master index can be created that includes the indexes from all the registered memory devices.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system for managing files on multiple storage devices, the system comprises:
    a hub, the hub has a plurality of input ports configured to connect a plurality of storage devices, each input port of the plurality of input ports has a unique code visually presented next to the respective input port;
    the system further comprises a processor and a memory, the system configured to implement a method comprising the steps of:
        connecting, through a device module implemented within the system and upon execution by the processor, to the plurality of storage devices, wherein the plurality of storage devices are connected to the plurality of input ports, wherein the device module comprises a mapping of the plurality of input ports to their respective unique codes;
        assigning, by the device module, a unique identification code to each storage device of the plurality of storage devices;
        presenting a screen, through an interface module implemented within the system and upon execution by the processor, wherein the screen comprises a plurality of barcode labels for each of the plurality of storage devices, wherein each barcode label of the plurality of barcode labels comprises a graphical representation of the respective unique identification code and the respective unique code;
        scanning a barcode label of a storage device of the plurality of storage devices;
        reading the unique identification code from the barcode label;
        presenting an index associated with the unique identification code;

indexing, by an indexing module implemented within the system and upon execution by the processor, files on the plurality of storage devices to generate a master index;

wherein store the index in the respective storage device with an autorun program, wherein the autorun is configured to track changes in files of the respective storage device; and the tracked changes are incorporated into the master index upon connecting the respective storage device to the system.

2. The system according to claim 1, wherein the plurality of input ports comprises USB Type-A ports and USB Type-C ports.

3. The system according to claim 1, wherein the system is further configured to implement the steps of:
presenting the master index, through an interface provided by the interface module;
receiving a keyword, through the interface for querying the master index; and
presenting results of querying the master index.

4. The system according to claim 1, wherein the hub is encased in an enclosure, the enclosure has an open top for gaining access to the plurality of input ports, the enclosure has a lid to cover the open top.

5. The system according to claim 1, wherein the system is further configured to allow printing of the plurality of barcode labels through a printer operably coupled to the system, wherein the respective unique code is visible on the printed barcode label.

6. The system according to claim 1, wherein the index of the storage device is presented without requiring the need to connect the respective storage device.

7. A method for organizing files on multiple storage devices, the method implemented within a system comprising a processor and a memory, the system further comprises a hub, the hub has a plurality of input ports configured to connect a plurality of storage devices, each input port of the plurality of input ports has a unique code visually presented next to the respective input port, wherein the method further comprises the steps of:
connecting, through a device module implemented within the system and upon execution by the processor, to the plurality of storage devices, wherein the plurality of storage devices are connected to the plurality of input ports, wherein the device module comprises a mapping of the plurality of input ports to their respective unique codes;
assigning, by the device module, a unique identification code to each storage device of the plurality of storage devices;
presenting a screen, through an interface module implemented within the system and upon execution by the processor, wherein the screen comprises a plurality of barcode labels for each of the plurality of storage devices, wherein each barcode label of the plurality of barcode labels comprises a graphical representation of the respective unique identification code and the respective unique code;
scanning a barcode label of a storage device of the plurality of storage devices;
reading the unique identification code from the barcode label;
presenting an index associated with the unique identification code;
indexing, by an indexing module implemented within the system and upon execution by the processor, files on the plurality of storage devices to generate a master index;
wherein store the index in the respective storage device with an autorun program, wherein the autorun is configured to track changes in files of the respective storage device; and
the tracked changes are incorporated into the master index upon connecting the respective storage device to the system.

8. The method according to claim 7, wherein the plurality of input ports comprises USB Type-A ports and USB Type-C ports.

9. The method according to claim 7, wherein the method further comprises the steps of:
presenting the master index, through an interface provided by the interface module;
receiving a keyword, through the interface for querying the master index; and
presenting results of querying the master index.

10. The method according to claim 7, wherein the method further comprises the steps of:
monitoring changes in files of the storage device; and
updating the master index based on the changes.

11. The method according to claim 7, wherein the method further comprises:
printing the plurality of barcode labels, through a printer operably coupled to the system; and
pasting a printed barcode label of the plurality of bar code labels to the respective storage device of the plurality of storage devices.

12. The method according to claim 11, wherein the respective storage device is plugged into the input port having the unique code same as the printed barcode label, wherein the method further comprises detecting the respective storage device from the plurality of storage devices based on the unique identification code of the printed bar code label.

13. The method according to claim 7, wherein the hub is encased in an enclosure, the enclosure has an open top for gaining access to the plurality of input ports, the enclosure has a lid to cover the open top.

14. The method according to claim 7, wherein the method further comprises:
storing the index in the respective storage device with an autorun program, wherein the autorun is configured to track changes in files of the respective storage device.

15. The method according to claim 14, wherein the method further comprises:
synchronizing the tracked changes with the master index upon connecting the respective storage device to the system.

16. The method according to claim 7, wherein the index of the storage device is presented without requiring the need to connect the respective storage device.

* * * * *